United States Patent
Lee et al.

(10) Patent No.: US 6,175,736 B1
(45) Date of Patent: Jan. 16, 2001

(54) METHOD AND SYSTEM FOR PROVIDING A POWER-EFFICIENT SOFT HANDOFF IN A MULTICARRIER CDMA CELLULAR SYSTEM

(75) Inventors: Dong Wook Lee; Hun Lee, both of Daejeon (KR)

(73) Assignee: Electronics and Telecommunications Research Institute, Daejon (KR)

( * ) Notice: Under 35 U.S.C. 154(b), the term of this patent shall be extended for 0 days.

(21) Appl. No.: 09/159,062

(22) Filed: Sep. 23, 1998

(30) Foreign Application Priority Data

Nov. 5, 1997 (KR) .................................................. 97-58244

(51) Int. Cl.$^7$ ...................................................... H04Q 7/20
(52) U.S. Cl. ........................ 455/442; 455/438; 455/439; 370/331; 370/332; 370/335
(58) Field of Search ..................................... 455/436, 437, 455/438, 439, 442, 422, 522, 525; 370/331, 332, 335

(56) References Cited

U.S. PATENT DOCUMENTS

| | | | |
|---|---|---|---|
| 5,101,501 | * | 3/1992 | Gilhousen et al. .................. 455/442 |
| 5,434,853 | * | 7/1995 | Hemmady et al. .................. 370/331 |
| 5,666,356 | * | 9/1997 | Fleming et al. ..................... 370/332 |
| 5,794,149 | * | 8/1998 | Hoo ..................................... 455/438 |
| 5,815,812 | * | 9/1998 | Zhou et al. .......................... 455/442 |

OTHER PUBLICATIONS

Performance of Multicarrier DS CDMA Systems; Shiro Kondo and Laurence B. Milstein; Feb. 1996; pp. 238–246.

* cited by examiner

*Primary Examiner*—Nay Maung
*Assistant Examiner*—Quochien Vuong
(74) *Attorney, Agent, or Firm*—Antonelli, Terry, Stout & Kraus, LLP

(57) ABSTRACT

A system for providing a power-efficient soft handoff in a multicarrier CDMA cellular system includes: a determining device for determining a time point when a user of a mobile station executes a handoff operation from one base station to an adjacent base station thereto, during the user communicates with another system's user through the one base station; a providing device for providing handoff request information inclusive of information of the adjacent base station; a base station control device for commanding the one base station and the adjacent base station to transmit stop of information of the another system's user, with non-assigned carrier and for commanding the adjacent base station to transmit start the information of the another system's user, with assigned carrier, in accordance with the hand off request information received through the one base station by the mobile station's user; a base station transmission device for transmitting the information of the another system's user only with the assigned carrier, in accordance with the assignment of carrier of the base station control device; and a receiving device of the mobile station's user for combining and demodulating received signals having different frequencies from the one base station and the adjacent base station.

8 Claims, 4 Drawing Sheets

METHOD AND SYSTEM FOR PROVIDING A POWER-EFFICIENT SOFT HANDOFF IN A MULTICARRIER CDMA CELLULAR SYSTEM

BACKGROUND OF THE INVENTION

1. Field of the Invention

The present invention relates to a cellular communication system, and more particularly, to a method and system for providing a power-efficient soft handoff in a mobile station which can increase power efficiency by using characteristics of a multicarrier code division multiple access(hereinafter, referred to as CDMA) cellular system.

2. Description of the Prior Art

In a prior art which is directed to a soft handoff in a mobile station in a CDMA cellular system, disclosed is a U.S. Pat. No. 5,101,501, entitled "Method and System for Providing a Soft Handoff in Communications in a CDMA Cellular Telephone System". An object of this patent is to provide a soft handoff method and system in a system using a single carrier. That is, since all base stations in a CDMA cellular system transmit the same frequency signal, a mobile station can receive all signals transmitted from the base stations.

Moreover, since each base station uses the same code having a long period, but spectrum-spreads information with the code which has different phase from each other, the mobile station can measure a received strength of a pilot signal in each of the base stations where encryption is not achieved and only a symbol "0" is spectrum-spread with code search at a time. Hence, during the mobile station communicates with other user through one base station, it can measure the strength of pilot signal in the adjacent base station to the base station to thereby determine its own handoff time point. Of course, the mobile station should separately include a receiver for performing a continual communication with one base station and a searcher for measuring a received strength of the pilot signal in each base station.

By the reasons as discussed above, if the mobile station can know user encryption information, it can demodulate an information channel signal in any base station. Therefore, when two base stations transmit the same information to one mobile station, the one mobile station can demodulate the received information from the two base stations.

At the time, the mobile station should of course include a separate receiver for each receiving the received signals from the two base stations. Using the characteristics of CDMA system, until a handoff operation from one base station to the other base station is started and completed, if the two base stations transmit the same information to the mobile station which is in a handoff state, the mobile station receives the signals transmitted from the two base stations and combines the received signals to demodulate the combined signals.

The mobile station measures a received strength of a pilot signal from an adjacent base station to the one base station. If the received strength of the pilot signal of the one base station is higher than that of the adjacent base station, the mobile station determines that its own handoff is completed. Then, the mobile station modulates only the information transmitted from the base station where the received strength of pilot sinal is highest and then requests communication stop.

Therefore, the mobile station can execute a safe handoff, without cutting communication with the base station. This is called "soft handoff" or "make-before-break".

The mobile station includes two receivers which receive the signals transmitted from two base stations, and upon performing the soft handoff, further includes a separate receiver which a multipath combining receiver(RAKE receiver) which combines multipath signal components of the received signal from one base station by using a direct sequence spread spectrum modulation.

As a result, from the time when the mobile station starts the soft handoff to the time it completes the soft handoff, the mobile station performs the diversity combining operation of the multipath signal components of each base station as well as performs the diversity combining operation of signals received from the two base stations, which enhances receiving performance.

In this case, however, the mobile station does not a separate receiver which is used only upon the soft handoff, but, among receivers which are used as the multipath combining receiver upon a normal operation, uses a part of the receivers to receive the signals transmitted from another base stations during the soft handoff.

Therefore, since the mobile station can not combine the multipath signal components from two base stations during the soft handoff, to compensate this defect, the two base stations should transmit higher power to the mobile station, when compared with the mobile station having the separate receiver that combines the multipath signal components from the two base stations.

As a result, all of the mobile stations receive a large number of interference signals, when compared with the case where the soft handoff is not executed. Hence, there occurs a disadvantage in that the base station decreases capacity of a forward link as a communication link of the mobile station.

SUMMARY OF THE INVENTION

Accordingly, the present invention is directed to a method and system for providing a power-efficient soft handoff in a multicarrier CDMA cellular system that substantially obviates one or more of the problems due to limitations and disadvantages of the related art.

An object of the invention is to provide a method and system for providing a power-efficient soft handoff which can perform a soft handoff, without decreasing capacity of a forward link, while not having a separate receiver for the purpose of the soft handoff, by using the characteristic of a multicarrier CDMA signal in a multicarrier CDMA cellular system.

To accomplish this and other objects of the present invention, there is provide a system for providing a power-efficient soft handoff in a multicarrier CDMA cellular system, comprising determining means for determining a time point to handoff from one base station to an adjacent base station providing means for providing handoff request information, the handoff request information including information for the adjacent base station; base station control means for commanding the one base station and the adjacent base station not to transmit information from another system's user through non-assigned carriers and for commanding the adjacent base station to transmit the information from another system's user through assigned carriers, in accordance with the handoff request information, base station transmission means for transmitting the information from another system's user only through the assigned carrier, in accordance with the assignment of carrier from the base station control means; and receiving means for combining and demodulating received signals transmitted from the one base station and the adjacent base station the signals being transmitted through different carrier frequencies from each other.

To accomplish this and other objects of the present invention, there is provided a method for providing a power-efficient soft handoff in a multicarrier CDMA cellular system, comprising the steps of: (a) determining a time point to handoff from one base station to an adjacent base station; (b) generating handoff request information from a mobile station, the handoff request information including information for the adjacent base station; (c) transmitting the handoff request information from the mobile station to a system controller through the one base station; (d) assigning a plurality of carrier frequencies to the one base station and the adjacent base station in accordance with the handoff request information; (e) commanding the one base station not to transmit information from the another system's user through non-assigned carriers; and (f) commanding the adjacent base station to transmit the information from another system's user through assigned carriers. The method further comprises steps of: (g) transmitting handoff completion information from the mobile station to a base station; (h) commanding the one base station not to transmit information from another system's user; and (i) commanding the another base station to transmit the information from the another system's user through the non-assigned carriers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF PREFERRED EMBODIMENTS

Reference will now be made in detail to the preferred embodiments of the present invention, examples of which are illustrated in the accompanying drawings.

Figure 1:
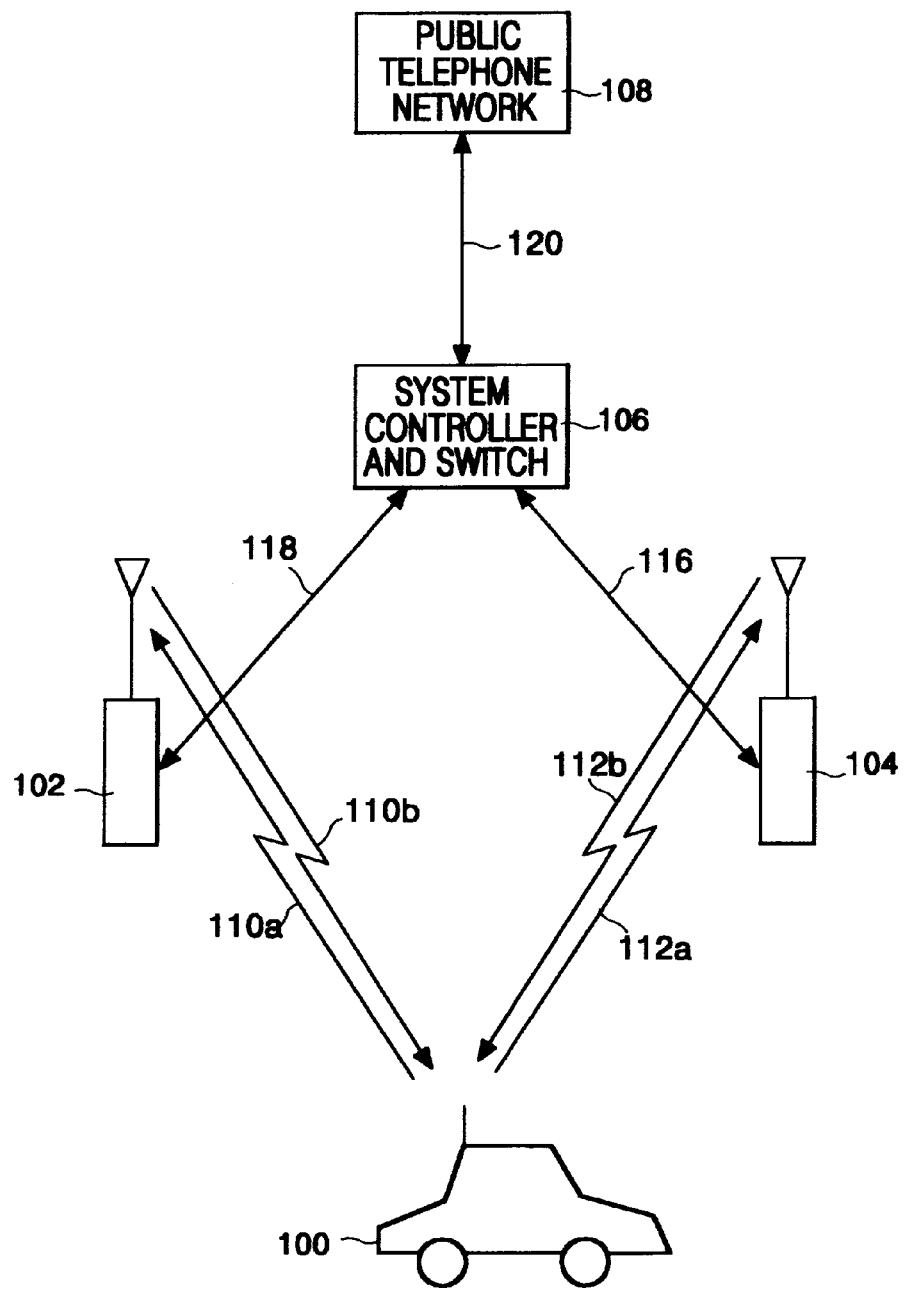
FIG. 1 is a flow diagram illustrating a soft handoff method in a CDMA cellular system according to the present invention.

FIG. 1 is a flow diagram illustrating a soft handoff method in a CDMA cellular system according to the present invention.

In the same manner as a general cellular system, a CDMA cellular system includes a plurality of base stations 102 and 104 which respectively have different control areas and are connected with a system controller and switch 106.

The system controller and switch 106 is connected to a public telephone network 108 to communicate a user who uses the public telephone network with a user of a mobile station 100.

In the CDMA cellular system, the base stations 102 and 104 modulate and transmit information with the same frequency as each other. At the time, the base stations 102 and 104 spectrum-spread the information by using an inherent code in the base stations and a code promised with the mobile station 100.

Accordingly, the mobile station 100 receives signals 110$b$ and 112$b$ transmitted from the two base stations 102 and 104, respectively, and reverse-spreads the received signals by using the code which is used for the spectrum spreading in the base stations 102 and 104, to thereby demodulate one of the signals which is transmitted to its own station.

A soft handoff in the CDMA cellular system is executed in the condition where all of the base stations in the CDMA cellular system transmit signals with the same frequency as each other.

Each of base stations always transmits a pilot signal as a symbol "0" to which a direct sequence spread spectrum is accomplished with the inherent code of each base station.

As a result, during the mobile station 100 communicates with another system's user through the base station 102, the mobile station 100 always can measure a received strength of the pilot signal of the base station 104 adjacent to the base station 102, and further can compare the received strength of the pilot signal of the adjacent base station 104 with that of the base station 102 to thereby determine as to whether its own position approximates any of the two base stations 102 and 104.

If the mobile station 100 is to change its own service area from the base station 102 and the adjacent base station 104, the mobile station 100 transmits handoff request information including information of the base station 104 to the system controller and switch 106 through the base station 102. Then, the system controller and switch 106 commands the base station 104 to transmit user information to be sent to the mobile station 100 and sends the command result to the mobile station 100 through the base station 102.

Therefore, the mobile station 100 simultaneously receives the same information from the base stations 102 and 104 until the handoff is started and completed and demodulates the received information by using a symbol combining technique where signal reception path diversity is employed. Further, the system controller and switch 106 receives signals which are transmitted to the mobile station 100 through the base station 102 and the adjacent base station 104 at the same time and restores the signals by using a symbol combining technique where signal reception path diversity is employed, to thereby transmit the restored signal information to another user.

If the mobile station 100 determines that the handoff operation to the adjacent base station 104 is completed, it informs the system controller and switch 106 of the fact and processes only the signal of the base station 104. The system controller and switch 106 commands the base station 102 to stop information transmission to the mobile station 100. As a result, the mobile station 100 can communicate with another user, without stop, even during the handoff.

The mobile station 100 includes a plurality of receivers which can perform a signal combining operation on the basis of signal reception path diversity by using direct sequence spread spectrum signal characteristic, during a normal operation as well as the handoff operation.

Therefore, the mobile station 100 should include separate receivers as many as the receivers which are used during the normal operation to thereby achieve the signal combining operation based upon the signal reception path diversity, upon the handoff operation.

Otherwise, the mobile station 100 should use a part of receivers which are used to receive the signal of the base station 102 during the normal operation, in receiving the signal of the base station 104.

If the separate receivers are included, cost of the mobile station device becomes high, and if the part of receivers is used, since the mobile station 100 should combine the signals by using the number of receivers smaller than the number of signal reception paths, the mobile station 100 fails to consume effective power. Accordingly, to compensate such the power loss, the total amount of signal power transmitted from the two base stations is great when compared with the normal operation, such that the base stations transmit a large number of interference signals to another mobile station's user.

Figure 2:
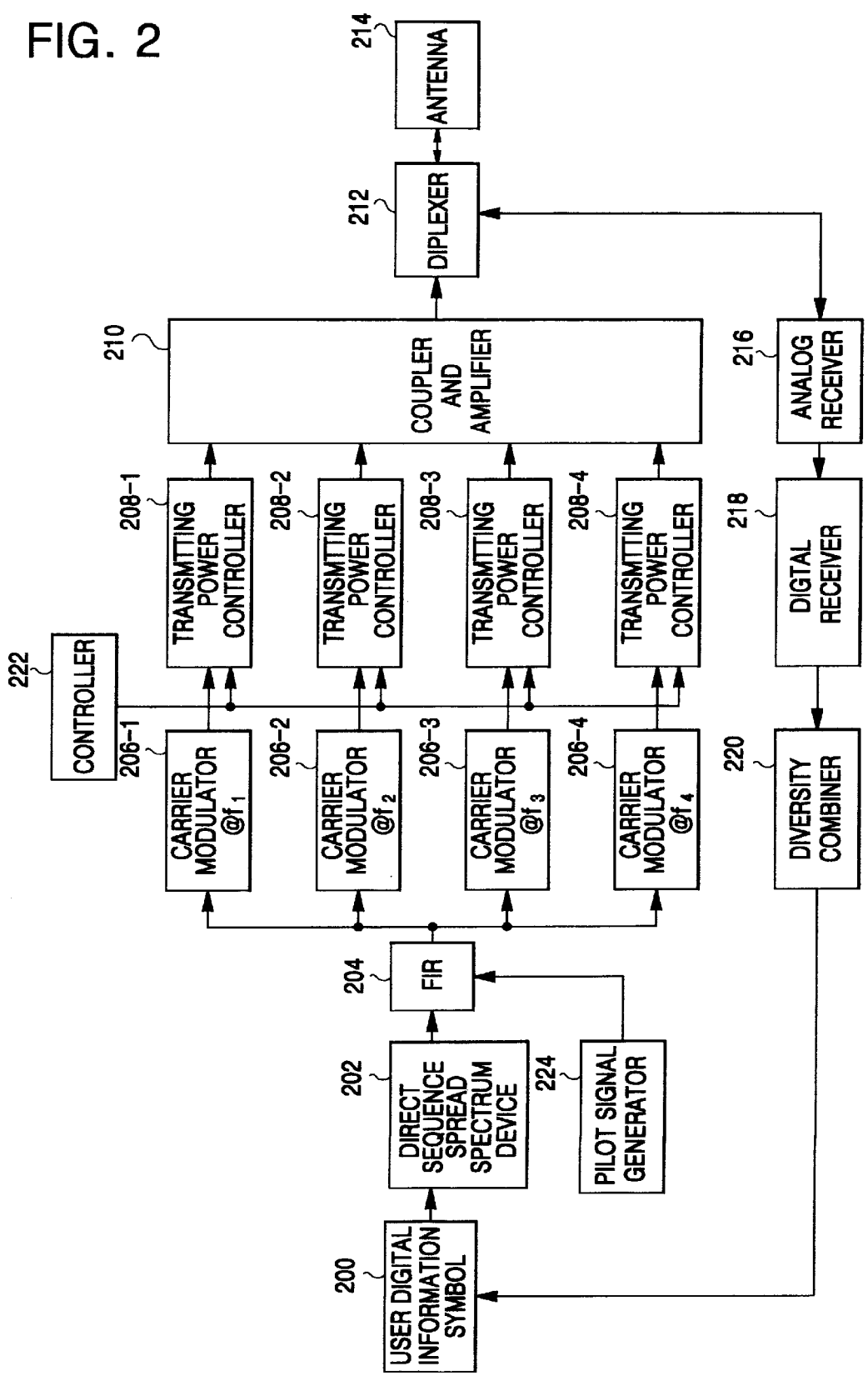
FIG. 2 is a schematic diagram illustrating a base station device in a multicarrier CDMA cellular system according to the present invention.

FIG. 2 is a schematic diagram illustrating a base station device in a multicarrier CDMA cellular system according to the present invention, in which the base station device transmits a signal by using a multicarrier CDMA method.

In figure, information of a user is digitalized and then channel coding and interleaving of the digital information are executed to produce a user digital information symbol 200.

This symbol 200 is spectrum-spread to a previously promised code through a direct sequence spread spectrum 202 and is added to a pilot signal generated from a pilot signal generator 224 in a finite impulse response(FIR) filter 204, thus to form a waveform.

Then, carrier modulators 206-1 to 206-4 modulate four carriers having different frequencies to the waveform formed baseband signals, and transmitting power controllers 208-1 to 208-4 respectively adjust transmitting power of the modulated signals and add their outputs to a coupler and amplifier 212. The added outputs in the coupler and amplifier 212 are amplified and transmitted through an antenna 214.

A controller 222 serves to control each of the transmitting power controllers 208-1 to 208-4 in accordance with frequency assignment command of the system controller and switch 106.

Therefore, if the controller 222 receives a transmitting stop command of a specific frequency signal from the system controller and switch 106, it commands a corresponding transmitting power controller to set its power value to be "0".

Figure 3:
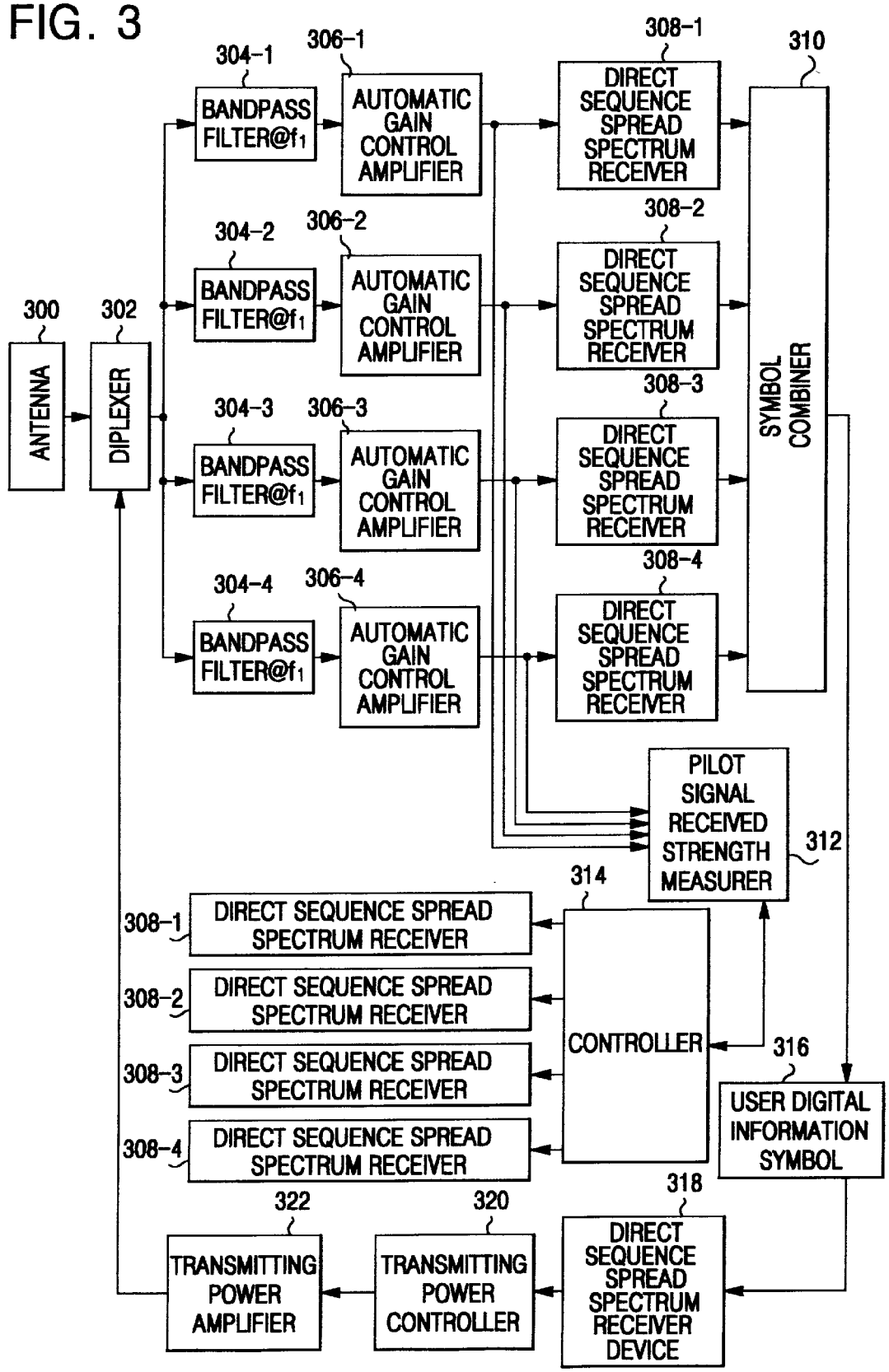
FIG. 3 is a schematic diagram illustrating a mobile station device in a multicarrier CDMA cellular system according to the present invention.

FIG. 3 is a schematic diagram illustrating a mobile station device in a multicarrier CDMA cellular system according to the present invention, in which the mobile station device receives a signal by using a multicarrier CDMA method.

Multicarrier having four different frequencies received from an antenna 300 is modulated and passed through basepass filters 304-1 to 304-4 in which each carrier frequency is set as a center frequency. Thus, each carrier component which has been achieved through the basepass filters is passed through each of automatic gain control amplifiers 306-1 to 306-4.

The automatic gain control amplifiers 306-1 to 306-4 serve to normalize a signal component necessary among total received signals as a total signal received strength.

Since this operation is similar to an operation which signal-to-noise ratio is multiplied by each signal component size to thereby perform a maximal-ratio-combining operation, a separate preparation for the maximal-ratio-combining is not required.

Each carrier component gain-controlled in the automatic gain control amplifiers 306-1 to 306-4 is reversely spread in direct sequence spread spectrum receivers 308-1 to 308-4 with a premised code and is added to a symbol combiner 310.

Thereby, using diversity of channel characteristic of each carrier frequency, that is, frequency diversity, the maximal-ratio-combining operation is completed.

Meanwhile, the outputs of the automatic gain control amplifiers 306-1 to 306-4 are inputted to a pilot signal received strength measurer 312, in which a received strength of the pilot signal in the base station which now communicates and a received strength of the pilot signal in the adjacent base station are continuously measured. Then, the pilot signal received strength measurer 312 inputs the measured result to a controller 314.

The controller 314 determines as to whether a handoff operation is executed, based upon the input result and accordingly sends a handoff request signal to the system controller and switch 106. In this case, the controller 314 receives a handoff start message and the information on the base stations in which the handoff operation is executed from the system controller and switch 106.

At the time, the information on the base stations in which the handoff operation is executed from the system controller and switch 106 includes information about a frequency assigned to each base station or about a phase of PN code.

Then, the controller 314 determines as to whether the received signal is demodulated with any phase of PN code in the direct sequence spread spectrum receivers 308-1 to 308-4.

Figure 4:
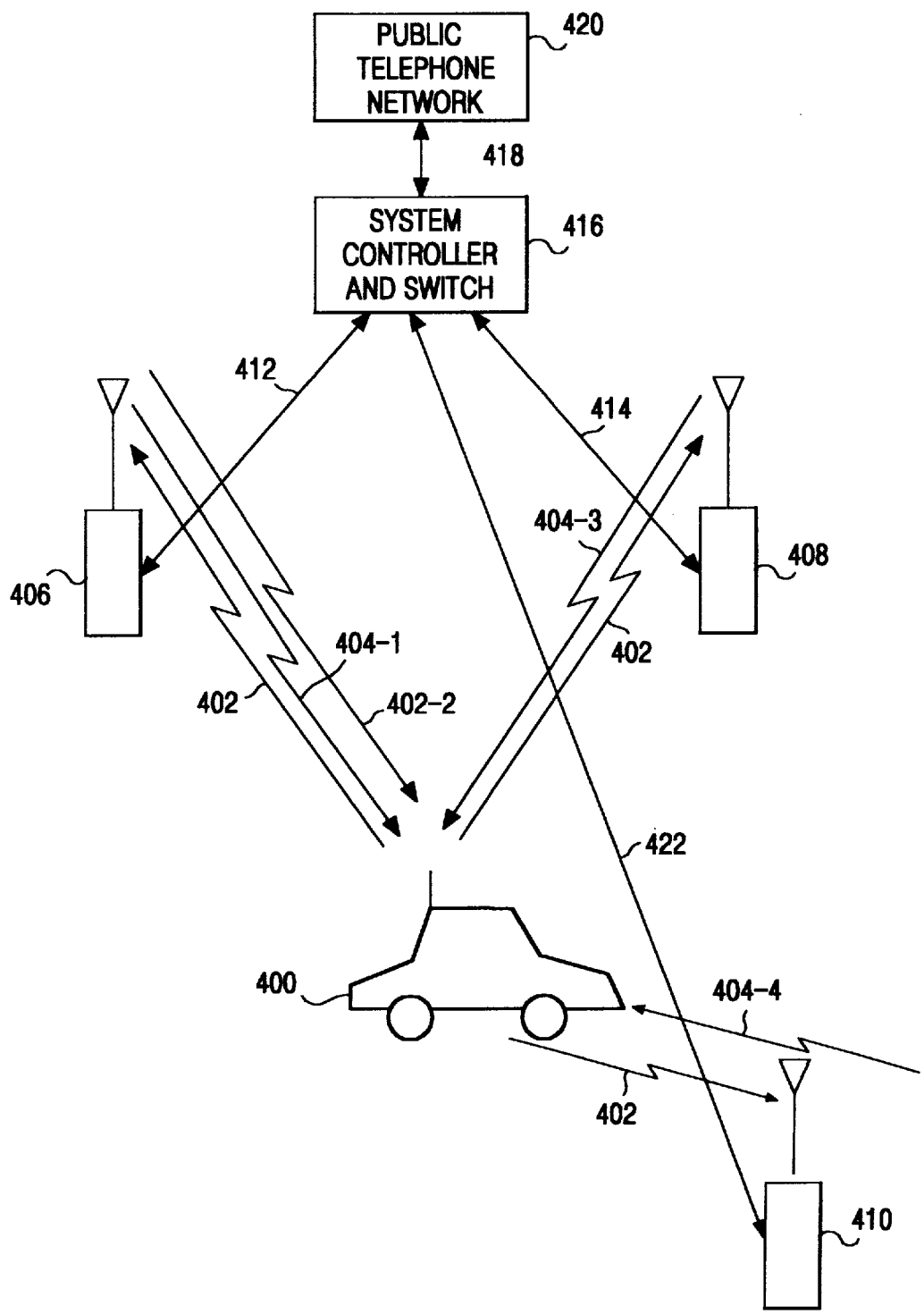
FIG. 4 is a flow diagram illustrating a soft handoff method between a plurality of base stations in a multicarrier CDMA cellular system according to the present invention.

FIG. 4 is a flow diagram illustrating a soft handoff method between a plurality of base stations in a multicarrier CDMA cellular system according to the present invention, which shows spectrum of a signal transmitted from each base station upon the soft handoff operation in the mobile station.

In a multicarrier CDMA cellular system which uses four carriers each having frequencies f1, f2, f3, and f4 (where, f1<f2<f3<f4), when a mobile station 400 communicates with a base station 406, if the mobile station 400 sends handoff request information to a system controller and switch 416 through the base station 406 to thereby execute a handoff operation in another service area, the system controller and switch 416 commands the base station 406 to transmit the information only with the carriers f1 and f4, an adjacent base station 408 which the transmission of the handoff request information is related to transmit the information only with the carrier f2, and another adjacent base station 410 to transmit the information only with the carrier f4.

An aim of division of the carriers in the base stations is to exhibit diversity of frequencies among different carriers received from the same base station by disposing at a great distance a frequency interval between the carriers transmitted in the base station 406.

If only the base station 408 is contained in the handoff information, the system controller and switch 416 commands the base station 406 to transmit the information with the carriers f1 and f3 and the base station 408 with the carriers f2 and f4.

The signals received with the carriers having the different frequencies from the different base stations are restored to a user data symbol by the symbol combiner 310 in the mobile station device of FIG. 3.

If the mobile station 400 determines that the handoff to the base station 410 is completed, it transmits handoff completion information to the system controller and switch 416 through the base stations 406, 408 and 410. Then, the system controller and switch 416 commands the base stations 406 and 408 to stop the transmission of information to the mobile station 400 and commands the base station 410 to transmit the information to the mobile station 400 with the remaining carriers f1, f2, and f3.

As described above, a method and system for providing a power-efficient soft handoff in a multicarrier CDMA cellular system according to the present invention can reduce power consumption of a base station upon a soft handoff operation of a mobile station, to thereby increase capacity of a subscriber in the cellular system.

It will be apparent to those skilled in the art that various modifications and variations can be made in a method and system for providing a power-efficient soft handoff in a multicarrier CDMA cellular system of the present invention without departing from the spirit or scope of the invention. Thus, it is intended that the present invention cover the modifications and variations of this invention provided they come within the scope of the appended claims and their equivalents.

What is claimed is:

1. A system for providing a power-efficient soft handoff in a multicarrier CDMA cellular system, comprising:
   determining means for determining a time point to handoff from one base station to an adjacent base station;
   providing means for providing handoff request information including information for the adjacent base station;
   base station control means for commanding the one base station and the adjacent base station not to transmit information from another system's user through non-assigned carriers, and for commanding the adjacent base station to transmit the information from the another system's user through assigned carriers, in accordance with the handoff request information;
   base station transmission means for transmitting the information from the another system's user only through the assigned carriers, in accordance with the assignment of carriers of said base station control means; and
   receiving means for combining and demodulating received signals transmitted from the one base station and the adjacent base station through different carrier frequencies from each other.

2. A method for providing a power-efficient soft handoff in a multicarrier CDMA cellular system, comprising steps of:
   (a) determining a time point to handoff from one base station to an adjacent base station;
   (b) generating handoff request information from a mobile station, said handoff request information including information for the adjacent base station;
   (c) transmitting the handoff request information from the mobile station to a system controller through the one base station;
   (d) assigning a plurality of carrier frequencies to the one base station and the adjacent base station in accordance with the handoff request information;
   (e) commanding the one base station not to transmit information from another system's user through non-assigned carriers; and
   (f) commanding the adjacent base station to transmit information from the another system's user through assigned carriers.

3. The method as claimed in claim 2, further comprising steps of:
   (g) transmitting handoff completion information from the mobile station to a base station control device through the one base station and the adjacent base station;
   (h) commanding the one base station not to transmit information from the another system's user; and
   (i) commanding the adjacent base station to transmit the information from the another system's user through the non-assigned carriers.

4. A cellular system for providing handoff, comprising:
   a plurality of base stations each of which transmits a pilot signal;
   at least one mobile unit which measures strengths of the pilot signal from respective base stations to determine its location from respective base stations; and
   a system controller connected to a telephone network, which controls operations of the respective base stations to enable a user of said telephone network to communicate with a user of said mobile unit, via respective base stations;
   wherein said mobile unit, when said mobile unit changes its own service area from a first base station to a second base station, transmits handoff request information including information of said second base station to said system controller, via said first base station;
   wherein said system controller, upon receipt of said handoff request information, commands said first base station and said second base station not to transmit information from said telephone network through non-assigned carriers, and commands said second base station to transmit information from said telephone network through assigned carriers; and
   wherein said mobile unit receives signals transmitted from said first base station and said second base station as said mobile unit changes its own service area from said first base station to said second base station to ensure communication with the user of said telephone network during said handoff.

5. A cellular system as claimed in claim 4, wherein said system controller further assigns a plurality of carrier frequencies to said first base station and said second base station in accordance with the handoff request information.

6. A cellular system as claimed in claim 5, wherein said system controller further commands said first base station to stop transmitting information from said telephone network, upon receipt of handoff completion information from said mobile unit indicating completion of said handoff.

7. A cellular system as claimed in claim 6, wherein said system controller further commands said second base station to transmit information from said telephone network through non-assigned carriers.

8. A cellular system as claimed in claim 4, wherein said system controller further commands said second base station to transmit information from said telephone network through non-assigned carriers.

* * * * *